J. BECKER, Jr.
Running-Gears.

No. 158,667.  Patented Jan. 12, 1875.

WITNESSES:  INVENTOR:
Jacob Becker Jr.
BY
ATTORNEYS.

UNITED STATES PATENT OFFICE.

JACOB BECKER, JR., OF SEYMOUR, INDIANA.

IMPROVEMENT IN RUNNING-GEARS.

Specification forming part of Letters Patent No. 158,667, dated January 12, 1875; application filed December 7, 1874.

CASE B.

*To all whom it may concern:*

Be it known that I, JACOB BECKER, Jr., of Seymour, in the county of Jackson and State of Indiana, have invented a new and Improved Wagon; and I do hereby declare that the following is a full, clear, and exact description of the same, reference being had to the accompanying drawing, forming a part of this specification, in which—

Figure 1:
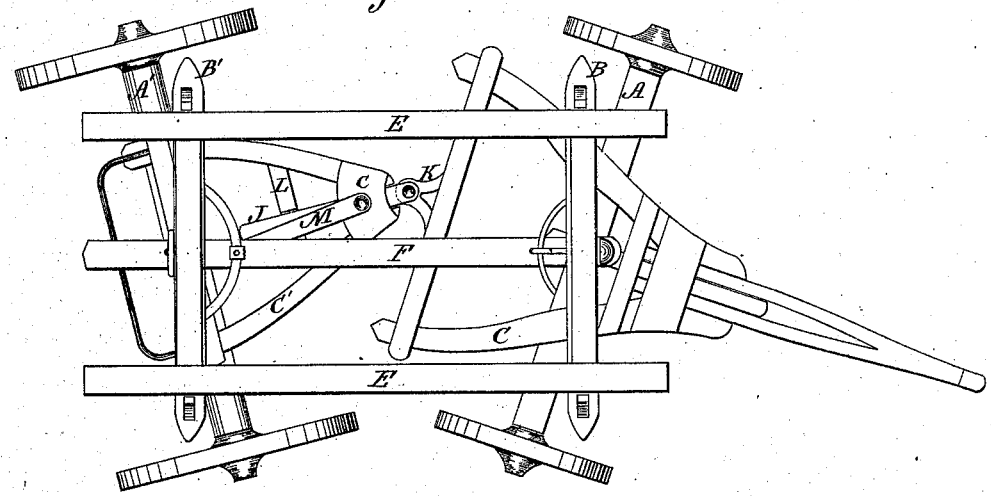
Figure 2:
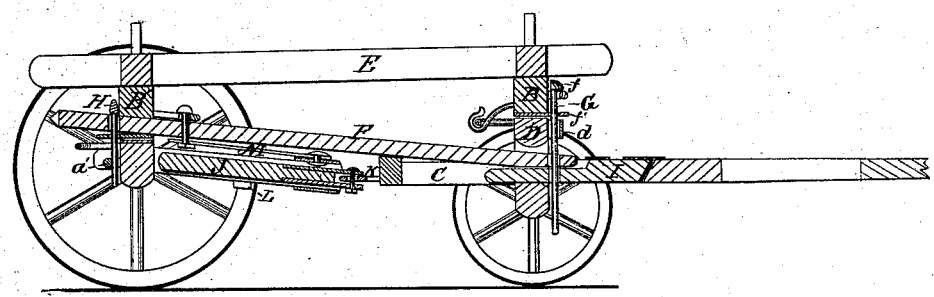

Figure 1 is a plan view. Fig. 2 is a vertical sectional elevation.

The invention relates to novel means by which the rear wheels of a vehicle may be made to follow in the track of the front wheels while turning, as well as at other times, and a means to prevent too short a turn, all as hereinafter described and claimed.

A A' represent the front and rear axles of a wagon or other vehicle; B B', the bolsters; C C', the hounds, and D the sand-board. I rigidly connect the bolsters B B' by a superposed frame, E, so that they can only turn together and with the frame. I also connect the latter with the axles A A' by the long reach F, which is made fast to the rear bolster, and pivoted on the outside of both bolsters by pins G H. These pins pass through the loops $f$ $f'$ $d$, the end of reach F, and through the axle-piece I in front, while in the rear the bolt passes through reach F and axle-loop $a'$. J is a sliding reach, passing between the rear hounds and through the hound-band $c$, while it is pivoted to a metallic loop, K, attached to the cross-bar of front hound. The sliding reach also is guided and supported by a subjacent cross-bar, L. The long reach F is then connected to the front end of rear hounds by the strap M, the latter and the sliding reach being thus enabled to prevent the vehicle from turning on too short a curve.

I am aware that the front and rear axles of a vehicle have been before connected with a long reach pivoted to each of said axles, while the hounds were connected by a short sliding reach, all for the purpose of making the fore and hind wheels track while turning; and I am also aware that projections, lugs, or studs have been made fast to a long reach, so as to strike the hounds, and thus limit the axles in their degree of turn; but

What I claim is—

1. The bolsters B B', frame E, and long reach F, connected rigidly together and pivoted to the front and rear axles, all combined as and for the purpose described.

2. The combination of the front and rear hounds with the long and sliding reaches F J and the strap M, to limit the curve on which the vehicle may turn, as set forth.

JACOB BECKER, JR.

Witnesses:
D. W. JOHNSON,
MICHAEL BURKART, Jr.